US006291562B1

(12) United States Patent
Kreuser

(10) Patent No.: US 6,291,562 B1
(45) Date of Patent: *Sep. 18, 2001

(54) WATER SENSITIVE HOT MELT ADHESIVE

(75) Inventor: John A. Kreuser, Hartford, WI (US)

(73) Assignee: Bostik Findley, Inc., Wauwatosa, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/619,859

(22) Filed: Mar. 19, 1996

Related U.S. Application Data

(63) Continuation of application No. 08/093,863, filed on Jul. 20, 1993, now abandoned.

(51) Int. Cl.[7] .................................................. C08K 5/521
(52) U.S. Cl. .................... 524/141; 524/151; 524/292; 524/297; 524/317; 524/270; 524/272; 524/377
(58) Field of Search ................................ 524/272, 317, 524/270, 145, 292, 297, 139, 141, 151, 377

(56) References Cited

U.S. PATENT DOCUMENTS

| 3,345,320 | * | 10/1967 | Uffner et al. | 524/312 |
|---|---|---|---|---|
| 4,033,918 | * | 7/1977 | Hauber | 428/514 |
| 5,080,978 | * | 1/1992 | Kulzick et al. | 525/231 |
| 5,252,646 | * | 10/1993 | Iovine et al. | 524/270 |
| 5,330,832 | * | 7/1994 | Liu | 428/355 |
| 5,356,963 | * | 10/1994 | Kauffman et al. | 524/43 |
| 5,385,965 | * | 1/1995 | Bernard et al. | 524/272 |
| 5,387,623 | * | 2/1995 | Ryan et al. | 523/124 |
| 5,527,845 | * | 6/1996 | Strelow et al. | 524/271 |

* cited by examiner

*Primary Examiner*—Judy M. Reddick
(74) *Attorney, Agent, or Firm*—Andrus, Sceales, Starke & Sawall, LLP

(57) ABSTRACT

A water sensitive hot melt adhesive composition is described which possesses properties which are desirable with respect to the construction of disposable articles. The adhesive composition includes about 5% to about 95%, by weight, of a poly [vinyl methyl ether]; about 5% to about 70%, by weight, of a tackifying resin; and about 5% to about 35%, by weight, of a water soluble plasticizer.

4 Claims, No Drawings

WATER SENSITIVE HOT MELT ADHESIVE

This application is a continuation of application Ser. No. 08/093,863 filed Jul. 20, 1993, now abandoned.

1. FIELD OF THE INVENTION

The present invention relates to water sensitive hot melt adhesive compositions and more particularly, to a water sensitive hot melt adhesive composition which finds utility in the manufacture of disposable soft goods such as diapers, feminine napkins and the like.

2. BACKGROUND OF THE INVENTION

The prior art is replete with numerous examples of hot melt adhesives which are employed for the construction of disposable soft goods. An example of a suitable hot melt adhesive for this purpose is disclosed in detail in U.S. Pat. No. 5,149,741 to Alper et al. Further, it is noted in that reference, that the prior art methods of application of these prior art adhesives have included, but are not limited to, extrusion [multi-bead or slot], spray or wheel application systems.

While the prior art hot melt adhesive compositions utilized heretofore have operated with varying degrees of success, they have shortcomings which have detracted from their usefulness. For example, and while disposable garments such as incontinent briefs and disposable diapers have gained wide acceptance and are convenient and easy to utilize, concerns have been expressed regarding the environmental impact of such garments once they have become unserviceable or soiled and thereafter disposed of in landfills or the like.

As should be understood, no readily convenient method is now available for recycling, or otherwise separating the components of a nonwoven object of interest such as a disposable diaper into its component parts whereby the components may be recycled or alternatively disposed of in an environmentally friendly manner thus reducing any adverse impact these objects may have.

3. OBJECTS AND SUMMARY OF THE INVENTION

It is therefore the object of the present invention to provide an improved water sensitive hot melt adhesive composition which is uniquely well suited for the manufacture of disposable soft goods.

It is a further object of the present invention to provide a water sensitive hot melt adhesive composition which can be employed as either a single or multi-purpose adhesive and which further can be applied by utilizing either extrusion or spray techniques to at least one polyolefin, or nonwoven substrate, and at least one other elastic, polyolefin, nonwoven, tissue or release liner substrate thereby forming a laminate.

Another object of the present invention is to provide a water sensitive hot melt adhesive which finds utility in the assembly of a disposable soft good and which has the following composition:

(a) about 5% to about 95%, by weight, of a poly (vinyl methyl ether);

(b) about 5% to about 70%, by weight, of a tackifying resin;

(c) about 5% to about 35%, by weight, of a water soluble plasticizer; and (d) about 0.1% to about 3%, by weight, of a antioxidant/stabilizer and wherein the water sensitive hot melt adhesive composition solubilizes at a predetermined rate when exposed to water.

Another object of the present invention is to provide a water sensitive hot melt adhesive composition which can be employed in connection with the manufacture of disposable soft goods, and wherein the hot melt adhesive composition has an excellent dry bond strength, but which can be induced to delaminate thereby permitting the component elements of the disposable soft good to be recycled or otherwise disposed of in an environmentally friendly manner.

Another object of the present invention is to provide a water sensitive hot melt adhesive composition which produces a dry bond strength which is substantially equal to that produced by the prior art adhesive compositions.

Another object of the present invention is to provide a water sensitive hot melt adhesive composition which has a viscosity of less than about 60,000 cP at 325° F., and which further does not increase in viscosity or gel even under prolonged heat aging at normal application temperatures.

Another object of the present invention is to provide a water sensitive hot melt adhesive composition which possesses an excellent balance of high specific adhesion, elevated temperature resistance and acceptable cohesive strengths at a relatively low viscosity.

Another object of the present invention is to provide a water sensitive hot melt adhesive composition which is operable to degrade at a predetermined rate when exposed to water or urine, and wherein the adhesive when incorporated into a nonwoven garment or disposable soft good maintains the garment in an assembled state during its normal use notwithstanding exposure to urine or water.

Another object of the present invention is to provide a water sensitive hot melt adhesive composition which displays enhanced spraying characteristics when compared to similar water soluble hot melt adhesive compositions.

Further objects and advantages of the present invention are to provide a water sensitive hot melt adhesive composition for the purposes described, and which is durable, easy to apply, by utilizing conventional manufacturing techniques, and which further does not have the shortcomings attributable to the prior art adhesives utilized heretofore.

DESCRIPTION OF THE PREFERRED EMBODIMENT

The preferred adhesive composition of the present invention, as noted above includes, about 5% to about 95%, by weight, of a poly (vinyl methyl ether); about 5% to about 70%, by weight, of a tackifying resin; about 5% to about 35%, by weight, of a suitable plasticizer, and about 0.1% to about 3%, by weight, of an antioxidant/stabilizer and wherein the hot melt adhesive composition solubilizes at a predetermined rate when exposed to water.

The hot melt adhesive composition of the present invention includes, as noted above, about 5% to about 95%, by weight, of a poly (vinyl methyl ether) polymer. The poly (vinyl methyl ether) polymer can be purchased commercially from the Amoco Chemical Company of Chicago, Ill. under the trade designation "Amobond."

The present formulation includes about 30% to about 70% by weight of a tackifying resin which is selected from the group which includes polymerized rosin; partially hydrogenated rosin; terpene phenolics; and partial esters of dibasic modified tall oil rosin. Commercially available polymerized rosins may be secured from Arizona Chemical Company under the trade designations "Sylvatac 295, RX, R85, 95, and 140," respectively. Additionally, Hercules Inc. produces a suitable polymerized rosin under the trade designation "PolyPale Resin." Commercially suitable partially hydrogenated rosins may be secured from the Hercules Inc. under the trade designations "Foral AX" and "Stabelite." Commercially suitable terpene phenolics may be secured from the Arizona Chemical Company under the trade designations "Nirez V2040" and "V2150," respectively. Finally, partial esters of dibasic modified tall oil rosins may be secured from Arizona Chemical Company under the trade designation "Sylvatac 203," and "Beckacite 4901."

A plasticizer is present in the composition of the present invention in amounts of about 5% to about 35%, by weight. A suitable plasticizer may be selected from the group which includes dipropylene glycol dibenzoate; pentaerythritol tetrabenzoate; polyethylene glycol 400-di-2-ethylhexoate; 2-ethylhexyl diphenyl phosphate; butyl benzyl phthalate, and various low molecular weight polyethylene glycols. Suitable dipropylene glycol dibenzoate and pentaerythritol tetrabenzoate may be purchased from the Velsicol Chemical Company of Chicago, Ill. under the trade designations "Benzoflex 9–88 and S-552," respectively. Further, a suitable polyethylene glycol 400-di-2-ethylhexoate may be purchased from the C.P. Hall Company of Chicago, Ill. under the trade designation "Tegmer 809." A suitable 2-ethylhexyl diphenyl phosphate, and a butyl benzyl phthalate may be purchased from the Monsanto Industrial Chemical Company of St. Louis, Mo. under the trade designation "Santicizer 141 and 160," respectively. Especially preferred are water soluble low molecular weight (200–600) polyethylene glycol fatty acid esters, such as polyethylene glycol 600 monooleate and polyethylene glycol 600 monolaurate and which may be purchased commercially from the C.P. Hall Company of Chicago, Ill. under the trade designation CPH41N, and CPH 43N, respectively; and a polyoxyethylene aryl ether, and which can be purchased under the trade designation "Pycol 94" from ICI Specialty Chemicals of Wilmington, Del.

The present invention may optionally include a stabilizer/antioxidant. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final assembled product to the ambianet environment. Such degradation is usually manifested by a deterioration in the appearance, physical properties and performance characteristics of the adhesive. Among the applicable stabilizers are high molecular weight hindered phenols and multifunctional phenols, such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5,-trimethyl-2,4,6-tris(3-5-ditert-butyl-4-hydroxybenzyl)benzene;

pentaerythritol tetrakis-3(3,5-di-tert-butyl-4-hydroxyphenyl)propionate;

n-octadecyl-3(3,5-di-tert-butyl-4-hydroxyphenyl) propionate;

4,4'-methylenebis(4-methyl-6-tert butylphenol);

4,4'-thiobis(6-tert-butyl-o-cresol);

2,6-di-tert-butylphenol;

6-(4-hydroxyphenoxy)-2,4-bis(n-ocytlthio)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-(3,3,5-di-tert-butyl-4-hydroxy-phenyl) propionate].

Especially preferred as a stabilizer is pentaerythritoltetrakis-3(3,5-di-tert-butyl-4-hydroxyphenyl) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine. These stabilizers may be purchased from any one of the several chemical companies noted earlier.

The hot melt adhesive composition of the present invention may be formulated using any of the techniques known in the art. A representative example of the prior art procedure involves placing all of the substances, in a jacketed mixing kettle, and preferably in a jacketed heavy duty mixer of the Baker-Perkins or Day type, and which is equipped with rotors, and thereafter raising the temperature of this mixture to a range of about 250° F. to 350° F. It should be understood that the precise temperature to be used in this step would depend on the melting point of the particular ingredients. The resulting adhesive composition is agitated until the polymers completely dissolve. A vacuum is then applied to remove any entrapped air.

It should be understood that other optional additives may be incorporated into the adhesive composition of the present invention in order to modify particular physical properties. These may include, for example, such materials as colorants, fillers, etc.

The invention is further illustrated by way of the (eight) (8) examples which are set forth in TABLE I below. Adhesive examples 5–8 were manufactured by the general procedure described above. Adhesive examples 1–4 are prior art hot melt adhesives which were commercially secured from Findley Adhesives Inc. of Wauwatosa, Wis. under the trade designation H4013. Adhesive examples 5–8 include a suitable tackifying resin (a terpene phenolic) secured from Arizona Chemical Company under the trade designation "Nirez V2040"; a poly (vinyl methyl ether) and which was secured from the Amoco Chemical Company under the trade designation "Amobond;" and a suitable water soluble plasticizer, which was secured from C.P. Hall Chemical Company under the trade designation "CPH41N" and which is a polyethylene glycol 600 monooleate. Adhesive formulations 5–8 include:

about 30%, by weight, of a poly (vinyl methyl ether);

about 47%, by weight, of a terpene phenolic; and about 23%, by weight, of a polyethylene glycol 600 monooleate.

TABLE I

|  | Adhesive Amount (Milligram per square inch) | Peel Strength in grams (dry) | Notes | Peel Strength in grams (wet) | Notes | Percent Wet/Dry Bond Strength |
|---|---|---|---|---|---|---|
| Example 1* | 3 | 180 | Adhesive Failure and Fiber tear | 208 | Adhesive Failure and Fiber tear | 116 |
| Example 2* | 6 | 424 | Fiber tear | 532 | Fiber tear | 125 |
| Example 3* | 10 | 782 | Fiber tear and Nonwoven Destruction | 858 | Fiber tear and Polyethylene Distortion | 110 |
| Example 4* | 20 | 968 | Complete Destruction | 1,148 | Complete Destruction | 118 |
| Example 5 | 3 | 116 | Cohesive Failure | 14 | Cohesive Failure | 12 |
| Example 6 | 6 | 266 | Cohesive Failure and Fiber tear | 54 | Cohesive Failure | 20 |
| Example 7 | 10 | 578 | Cohesive Failure Fiber tear and Polyethylene Distortion | 142 | Cohesive Failure | 25 |
| Example 8 | 20 | 1,282 | Cohesive Failure Polyethylene Distortion | 366 | Cohesive Failure | 29 |

*Hot melt Adhesive from Findley Adhesives, Inc. "H4013."

Following the formulation of adhesive examples 5–8 which are summarized above, each of the examples were tested with respect to viscosity; dry peel strength; and wet peel strength. In this regard, wet peel strength was determined following a five (5) minute soak in tap water. The tests further included a determination of the suitability of the same adhesive when spiral sprayed. Viscosity was measured by employing conventional technology. More particularly, the viscosity of each of the adhesive formulation examples was measured at a temperature of 325° F., and is expressed hereinafter in Centipoise [cP]. A Brookfield Thermosel was utilized to determine the viscosity. The viscosity measurements were done in accordance with ASTM method D 3236-73.

As noted above, the suitability of the adhesive composition for use in spray applications is determined by visually inspecting laminates following application of the adhesive using typical spray application equipment. With respect to the dry peel and wet peel bond strength tests, it should be understood that laminates were prepared and which include a polyethylene back sheet upon which is applied the adhesive candidate to be tested. In particular, one spiral sprayhead was mounted on an Acumeter LH-1 Coater. Each of the adhesive composition examples were then extruded at a temperature of 300° F. through a 0.018 inch nozzle. The adhesive compositions were sprayed onto the polyethylene substrate to an amount equal to about 3.0, 6.0, 10.0, and 20.0 mg. per square inch, respectively. During the process, an air temperature of approximately 400° F. was employed. After an open time of approximately 0.5 second, the polyethylene sheet was pressed into contact with a nonwoven substrate to form a laminate. Following preparation of the laminates by means of the process outlined, above, samples of the laminates were tested for their dry peel bond strength by subjecting each of the laminates to a 180° peel with an Instron tensile tester at a cross head speed of approximately 12 inches per minute and in the machine direction. Other samples of the same laminates are then submerged for five (5) minutes in tap water. Following submersion for five minutes, the selected laminates are removed and are immediately subjected to a 180° peel to determine the wet peel bond strength at the same speed of approximately 12 inches per minute. Following both tests, the laminates are inspected and their characteristics are noted. Further, Table I displays the wet bond strength as a percentage of the dry bond strength to further contrast the characteristics of the prior art adhesive, and that of the present invention.

An analysis of the test results, noted above, demonstrate that the adhesive compositions of the present invention provide unusually desirable characteristics when combined with a nonwoven, and polyethylene substrate to form disposable soft goods. For example, it should be recognized that the adhesive composition of the present invention produces desirable viscosities, that is, viscosities that are less than 60,000 cP thereby permitting it to be utilized in all the prior art application methods. Additionally, the present adhesive formulation (Examples 5–8) in the dry peel test demonstrates sufficient bond strength to make it suitable as a construction type adhesive for nonwoven garments and the like. The test results are further surprising in view of wet peel strength of the adhesive formulations. More specifically, a review of the test results demonstrate that the strength of the adhesive bond rapidly degrades to the point of being insignificant when exposed to water. In addition to the foregoing the spray characteristics of the adhesive are acceptable by industry standards.

These test results demonstrate that the adhesive composition of the present invention can be utilized as an adhesive for manufacturing a laminate that may be a component part of a nonwoven garment, but which further, when exposed to water readily degrades thereby permitting the component portions of the laminate to be separated, one from the other, for purposes of recycling, disposal, or the like.

In summary, therefore, it will be noted that the adhesive compositions of the present invention provide a fully dependable and practical means for adhesively assembling a disposable soft good such as a disposable diaper, feminine napkin and the like, and which further avoids the detriments associated with the prior art practices which includes, among others, employing an adhesive which inhibits the disassembly of the garment following its utilization for purposes of recycling, disposal or the like. In addition to the foregoing, the improved water sensitive hot melt adhesive composition of the present invention shows surprising and unusually desirable manufacturing viscosities and bond strengths which are comparable to those achieved by the prior art.

It will be apparent to those skilled in the art that the foregoing examples have been made for purposes of illustration and that variations may be made in proportions, procedures and material without departing from the scope of the present invention. Therefore, it is intended that this invention not be limited except by the claims which follow:

Having described my new invention, what I claim as new and desire to secure by Letters Patent of the United States is:

1. A hot melt adhesive composition for constructing a disposable soft good, and wherein the adhesive composition is operable to bind a polyolefin or nonwoven substrate to at least one elastic, polyolefin, foam, tissue, release liner or nonwoven substrate, the hot melt adhesive composition consisting of:

about 5% to about 95%, by weight, of a poly (vinyl methyl ether);

about 5% to about 70%, by weight of a tackifying resin;

about 5% to about 35% by weight, of a water soluble plasticizer; and about 0.1% to about 3%, by weight of a stabilizer;

the components totaling 100% by weight of the composition, and wherein the adhesive composition maintains the disposable soft good in an assembled condition during normal use but degrades when exposed to water thereby permitting the disposable soft good to be disassembled, and wherein the hot melt adhesive has a wet peel strength less than its original dry peel strength following exposure to water for a period of about 5 minutes, said peel strength determined by a 180° peel test utilizing a cross head speed of 12 inches/minute conducted on a sample having a spiral spray adhesive pattern with a coat weight of 10 mg/inch$^2$ of adhesive between a polypropylene nonwoven substrate and a 1.1 mil polyethylene substrate.

2. A hot melt adhesive composition as claimed in claim 1, and wherein the tackifying resin is selected from the group consisting of polymerized rosin, partially hydrogenated rosin, terpene phenolics, resin acids, and partial esters of dibasic modified tall oil rosin.

3. A hot melt adhesive composition as claimed in claim 1, and wherein the water soluble plasticizer is selected from the group consisting of dipropylene glycol dibenzoate, polyethylene glycol 400 di-2-ethyl hexoate, 2-ethylhexyldiphenyl phosphate, butyl benzyl phthalate, polyethylene glycol, and polyethylene glycol fatty acid esters.

4. A hot melt adhesive composition consisting of:

about 30%, by weight, of a poly (vinyl methyl ether);

about 47%, by weight, of a terpene phenolic resin; and about 23%, by weight, of a polyethylene glycol 600 monooleate, the components totaling 100% by weight of the composition, and wherein the hot melt adhesive has a wet peel strength less than its original dry peel strength following exposure to water for a period of about 5 minutes, said peel strength determined by a 180° peel test utilizing a cross head speed of 12 inches/minute conducted on a sample having a spiral spray adhesive pattern with a coat weight of 10 mg/inch$^2$ of adhesive between a polypropylene nonwoven substrate and a 1.1 mil polyethylene substrate.

* * * * *